United States Patent [19]

Miano et al.

[11] Patent Number: 5,424,283
[45] Date of Patent: Jun. 13, 1995

[54] DRILLING MUDS EFFECTIVE AT HIGH TEMPERATURE

[75] Inventors: Fausto Miano, Enna; Antonello Pittalis; Thomas P. Lockhart, both of Milan; Stefano Carminati, Bergamo; Giovanni Burrafato, Milan, all of Italy

[73] Assignees: Eniricerche S.p.A.; AGIP S.p.A., both of Milan, Italy

[21] Appl. No.: 283,665

[22] Filed: Aug. 1, 1994

Related U.S. Application Data

[63] Continuation of Ser. No. 18,444, Feb. 16, 1993, abandoned.

[30] Foreign Application Priority Data

Apr. 10, 1992 [IT] Italy ................. MI92A0869
Sep. 24, 1992 [IT] Italy ................. MI92A2190

[51] Int. Cl.$^6$ ................................. C09K 7/02
[52] U.S. Cl. ........................................ 507/109
[58] Field of Search ............................. 507/109

[56] References Cited

U.S. PATENT DOCUMENTS

| | | | |
|---|---|---|---|
| 3,762,485 | 10/1973 | Chesser et al. | 507/103 |
| 3,843,524 | 10/1974 | Perricone et al. | 507/103 |
| 4,220,585 | 9/1980 | Javora et al. | 252/8.5 |
| 4,311,600 | 1/1982 | Firth, Jr. | 252/8.5 |
| 4,341,645 | 7/1982 | Blattel et al. | 252/8.5 |
| 4,447,339 | 5/1984 | Detroit | 252/8.5 |
| 4,457,853 | 7/1984 | Detroit | 252/8.5 |
| 4,477,360 | 10/1984 | Almond | 252/8.551 X |
| 4,521,578 | 6/1985 | Chen et al. | 252/8.5 X |
| 4,572,789 | 2/1986 | Uemura et al. | 252/8.5 |
| 4,594,169 | 6/1986 | Saito et al. | 252/8.5 |
| 4,606,772 | 8/1986 | Almond et al. | 252/315.3 X |
| 4,618,433 | 10/1986 | Allison, III | 509/109 |
| 4,647,505 | 3/1987 | Blackie et al. | 428/396 |
| 4,664,713 | 5/1987 | Almond et al. | 523/130 X |
| 4,755,307 | 7/1988 | Turner et al. | 252/8.51 X |
| 4,799,550 | 1/1989 | Harris et al. | 166/300 |
| 4,851,142 | 7/1989 | Scoggins et al. | 252/8.515 |
| 4,889,645 | 12/1989 | Firth, Jr. | 252/8.514 |
| 4,921,620 | 5/1990 | Firth, Jr. | 252/8.513 |
| 5,089,149 | 2/1992 | Ridland et al. | 252/8.551 |
| 5,124,312 | 6/1992 | Wang | 507/109 |

FOREIGN PATENT DOCUMENTS

0136773 4/1985 European Pat. Off. .

*Primary Examiner*—Philip Tucker
*Attorney, Agent, or Firm*—Oblon, Spivak, McClelland, Maier & Neustadt

[57] ABSTRACT

Aqueous drilling muds effective at high temperature containing complexes, preformed or formed in situ, of tetravalent zirconium with one or more organic acids, or relative salts, of general formula (I)

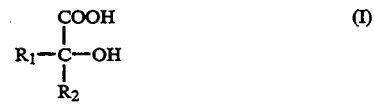

where $R_1$ and $R_2$, which can be the same or different, represent —H, —COOH, —CH$_3$, —CH$_2$COOH or —CH(OH)COOH, or $R_1$ and $R_2$ jointly represent an oxo group (=O).

12 Claims, No Drawings

DRILLING MUDS EFFECTIVE AT HIGH TEMPERATURE

This application is a Continuation of application Ser. No. 08/018,444, filed on Feb. 16, 1993, now abandoned.

This invention relates to fluid aqueous drilling muds effective even at high temperature.

More particularly, the invention relates to drilling muds with added tetravalent zirconium complexes.

Aqueous drilling muds usually consist of aqueous suspensions of clays, generally bentonite, fluidified with dispersants or fluidifying agents to prevent excessive increase in viscosity, yield stress and gel strength during drilling. The said aqueous muds may also contain other types of additives, the most usual being filtrate reducers and viscosity modifying agents.

This deterioration in the theological properties of the mud can be due either to its contamination by salts or solid particles which enter into suspension or to dispersant deterioration due to the progressive temperature increase.

When considerable drilling depths are reached, as increasingly happens during well drilling, the temperature increase due to the geothermal gradient induces considerable changes in the mud properties, and in particular an increase in viscosity and yield stress. Mud fluidifying additives are therefore particularly used for high temperature work, in which the theological problems are greatest.

The main mud fluidifying agents include lignosulfonates, these being by-products of the sulfite process for separating the cellulose part from the lignin part of wood.

The effectiveness of these high temperature fluidifying agents can be improved if certain metals such as chromium, zinc or titanium are present, as described in U.S. Pat. No. 2,953,473. However, even said lignosulfonates lose their fluidifying properties at about 120°-140° C. The system properties can be restored, or at least its degradative process can be delayed, by adding sodium chromate. The fluidifying agents most resistant to temperature are the lignites, these being a fossil material consisting mainly of humic acids water-soluble in their salified form. Lignites can be used in the form of the sodium or potassium salt or complexed with chromium (U.S. Pat. No. 3,766,22).

The known art provides a series of indications for improving the dispersing properties of lignites, for example by reaction with hexavalent chromium salts at 80° C., as described in U.S. Pat. No. 3,956,142, or with trivalent chromium salts such as $CrCl_3.6H_2O$ or $Cr(CH_3COO)_3$.

Lignite or lignin products can be further modified or replaced by tannin sulfoalkylates. These latter, the preparation of which is described in U.S. Pat. No. 3,537,991, derive from reacting a tannin with a carbonyl compound and sulfurous acid or its salts in an alkaline aqueous medium. EP-A-331,158 describes a mud additive comprising a tannin sulphoalkylate with added Cr(III) or Cr(II) acetate, possibly in the presence of a lignite.

The effect of chromium on lignites is considered to be due to the capacity of lignites to be complexed by trivalent chromium.

However the presence of hexavalent chromium seems to be essential for the proper operation of the additive at high temperature. In this respect, the most effective commercially available chromium lignites contain hexavalent chromium.

It is possible (as sustained by W. G. Skelly, D. E. Dieball in "Society of Petroleum Engineers Journal" June 1970 Transaction Vol. 249, pp 140-144) that the hexavalent chromium is reduced to trivalent chromium at the expense of the lignite organic part, so generating Cr(III) during the course of drilling.

In any event, as an excess of hexavalent chromium is added, chromium is found in the spent mud still partly in hexavalent form, with consequent environmental problems in that the toxicity limits of this metal in its maximum oxidation state are very low. Again, Cr(III) salts also have a certain degree of toxicity, but to a lesser extent than the corresponding Cr(VI) salts.

As a result of the need to conduct the drilling under high temperature conditions and to avoid or at least reduce the presence of chromium at any oxidation level in the spent mud, a mud composition of low chromium content (preferably totally chromium free) is sought which is able to maintain good high temperature performance with time.

In "Society of Petroleum Engineers" (No. 16281, 1987), L. S. Park describes chromium-free muds based on lignosulfonates complexed with titanium and/or zirconium which besides having poorer performance than chromium lignosulfonate have the drawback of not being able to be used at high temperature.

U.S. Pat. No. 3,762,485 describes complexes of polyvalent metal ions with a complexing agent chosen from acetic acid, citric acid, formic acid, lactic acid, oxalic acid and tartaric acid, said complexes being useful in preventing agglomeration of the layer clays during oil well drilling.

U.S. Pat. No. 3,843,424 describes the use of the complexes of U.S. Pat. No. 3,762,485 in preventing clay swelling in the preparation of ceramics, pigments, drilling fluids etc. In both these documents the preferred polyvalent metal ion is aluminum.

According to the present invention it has now been found that of the polyvalent metals, the zirconium ion, complexed with particular complexing agents, is able to stabilize to an unexpectedly high temperature (up to about 200° C.) aqueous drilling muds fluidified by additives chosen from lignosulfonates, lignites and modified tannins.

This also leads to obvious advantages from the environmental viewpoint as it reduces or eliminates the problem caused by the presence of chromium of any valency in drilling mud.

In accordance therewith the present invention provides a drilling mud composition based on water and clays which is stable to about 200° C., characterised by containing:

a) a dispersant chosen from lignosulfonates, lignites and modified tannins;
b) a complex, preformed or formed in situ, of tetravalent zirconium with one or more organic acids, or relative salts, of general formula (I)

where $R_1$ and $R_2$, which can be the same or different, represent —H, —COOH, —CH₃, —CH- $_2$COOH or —CH(OH)COOH, or $R_1$ and $R_2$ jointly represent an oxo group (=O).

In one embodiment the dispersants are chosen from ignites, lignosulfonates and modified tannins of alkaline or alkaline earth metals, or iron, chromium, aluminium, titanium, tin, zinc or ammonium, or their mixtures.

The dispersants are preferably chosen from:
sodium, iron-chromium, iron and tin lignosulfonates;
alkaline metal, chromium or ammonium lignites;
tannin sulfoalkylates, the counter-ion of which is chosen from chromium, heavy metals, alkaline metals and ammonium. Even more preferably, particularly if mud of excellent rheological properties, high-temperature stability and non-polluting is required, the dispersants are chosen from tin and-/or iron lignosulphonates, sodium and/or potassium lignites, and tannin sulphoalkylates of alkaline metals or ammonium.

When referring to a lignosulfonate, lignite or modified tannin of a certain metal, the presence of different counter-ions in smaller quantities is not excluded.

The dispersants are present in the mud in a concentration variable according to various parameters, such as the type of dispersant, mud composition and the drilling conditions. Usually the dispersant is present in a quantity of between 0.1 and 5 wt %, and preferably between 0.3 and 3%. A single dispersant or a dispersant mixture may be used. For example a mud composition is often used containing lignosulfonate and lignite dispersants, preferably in a weight ratio of about 2 parts of lignosulfonate to one part of lignite.

The addition of the zirconium complex of the present invention considerably improves the theological properties and temperature resistance of said muds.

The zirconium complexes of the present invention can also include one or more hydroxide or oxygen species (and the tetravalent zirconium be in the form of the zirconyl ion) or other species not essential to the complex, such as water molecules etc.

It is essential that the complexed polyvalent metal be zirconium. In this respect, complexes of acids of general formula (I) with polyvalent metals such as aluminum or iron are not effective in drilling mud compositions used at high temperature.

The compounds of general formula (I) can be in acid or salified form, the counter-ion not influencing the properties of the complex. Because of the toxicity of chromium, the counter-ion is preferably other than chromium. It is even more preferable for the compounds of general formula (I) to be in acid form or be salified with a counter-ion chosen from the alkaline or alkaline-earth metals or the ammonium group.

By way of example, useful for implementing the present invention are tetravalent zirconium complexes, either as such or salified, with lactic acid ($R_1$ and $R_2$ in general formula (I) being —H and —CH$_3$), citric acid ($R_1$ and $R_2$, identical with each other, being —CH$_2$COOH), tartaric acid ($R_1$ and $R_2$, being —H and —CH(OH)COOH), glycolic acid ($R_1$ and $R_2$, identical with each other, being —H), malic acid ($R_1$ and $R_2$ being —H and —CH$_2$COOH) oxalic acid ($R_1$ and $R_2$ jointly representing an oxo group).

It is essential that the complexing agent be chosen from the acids of general formula (I). In this respect, complexes of zirconium with a simple carboxylic acid such as acetic acid or formic acid are not effective.

The tetravalent zirconium complexes of the present invention can be prepared in various ways as described in the literature. For example A. N. Ermakov et. al report the preparation of tetravalent zirconium complexes with certain acids of general formula (I) (Russian Journal of Inorganic Chemistry vol. 12 (10), 1967, page 1437).

These methods start with zirconyl chloride or acetate in aqueous solution, to which the complexing agent of general formula (I) is added, the zirconium complexes being precipitated under acid pH conditions, recovered, washed with water and dried.

Alternatively, said complexes can be isolated by precipitation with ethanol from aqueous solutions of $ZrOCl_2.8H_2O$ and the complexing agent, adjusted to about pH 10 with NaOH.

In one embodiment of the present invention the said tetravalent zirconium complex is prepared separately with the acid of general formula (I); depending on the type of ligand the stoichiometric molar ratio of acid of formula (I) to zirconium salt is between 1/1 and 4/1.

The preformed complex (or the relative salt) is then added, or vice versa, to the base mud. Alternatively the preformed zirconium complex plus an excess of acid of general formula (I), up to about 25/1 molar, can be added to the base mud, the optimum excess depending on the type of acid of general formula (I), the temperature and the type of dispersant.

The term "base mud" means a clay-based aqueous drilling mud containing (in addition to possible other additives present in usual drilling muds, these being mainly viscosity modifying agents and filtrate reducers) dispersants chosen from the aforelisted.

The complexes or relative salts of the present invention can be added to the base mud either as such or as an aqueous solution or dispersion, preferably as an aqueous solution.

In a further embodiment of the present invention, one or more acids, or relative salts, of general formula (I) and any tetravalent zirconium salt are added to the base mud, preferably in the form of an aqueous solution, so as to form the zirconium complex or complex mixture in situ. The molar ratio of the reagents varies from approximately stoichiometric to an excess of the acid (I) over the zirconium salt of about 40/1.

The optimum ratio generally depends on various parameters, such as the type of acid or relative salt of general formula (I), the temperature and the dispersant. For example, lactic acid and glycolic acid are effective even if used in a molar ratio of about 18/1 to the zirconium salt.

It is important to vigorously mix the mud together with the additive at least for a few minutes in order to homogenize it adequately.

The tetravalent zirconium complexes with the acids of general formula (I), either preformed or formed in situ, are added to the base mud in a variable quantity depending on various parameters such as the structure of the acid (I), the type of mud, and the conditions encountered in drilling the well.

It can however be stated that the $Zr^{+4}$ complex is generally present in the drilling mud in a quantity, expressed as 8rams of $Zr^{+4}$ of between 0.01 wt % and 0.4 wt %, and preferably between 0.02 and 0.2 wt %.

The mud obtained in this manner is fluid even at a temperature of about 200° C., and is also stable in the presence of bivalent ions. If the rheological properties worsen due to prolonged use at high temperature, the desired fluidity characteristics can be restored by further additions of the $Zr^{+4}$ complex (or of a zirconium salt plus one or more acids of general formula (I) and dispersants). The performance of the thus formulates muds is often better than that of mud containing iron-chromium lignosulfonates and or sodium or chromium lignites, which have been considered up to the present time to be the only non-synthetic fluidifying additives effective even at high temperature.

According to the present invention it is also possible to effectively solve the environmental problem due to the presence of chromium in muds of the known art. In this respect, high temperature-effective muds totally free of chromium can be prepared by using $Zr^{+4}$ complexes and dispersants, particularly lignites, salified with ions chosen from alkaline or alkaline-earth metals, iron or the ammonium group.

The following examples are given to better illustrate the present invention.

All the samples described in the examples were prepared by agitation with a standard Hamilton Beach agitator, the various components being added in the order described in each specific example.

The rheological properties of the fluids of Examples 1–12 were measured, before and after ageing, using a FANN 35SA viscometer in R1F1B1 configuration following the procedure detailed in the API RP 13B-1 specification.

The measurements on the fluids of Examples 13–15 were taken, before and after ageing, as described in Example 13.

Before taking the rheological measurements on the aged samples, these were agitated for 5 minutes using a Hamilton Beach agitator.

EXAMPLE 1

A drilling fluid is prepared by the following procedure.

A suspension of bentonite in water is mixed vigorously in a blender for 15 minutes. The dispersion obtained is left standing for about 16 hours to allow hydration of the dispersed solids, and is then divided into aliquots.

A commercial iron-chromium lignosulfonate ("Q-Broxin" of the Baroid Company), a commercial chromium lignite ("Chrome-lignite" of Baroid), Tabiano clay in powder form (suitable for simulating the behaviour of a contaminant layer clay) and commercial barytes with the characteristics of API 13A were added to one aliquot to form a reference sample marked F1.

The final (wt %) composition of this reference sample F1 is as follows:
Wyoming bentonite 6.4%
iron-chromium lignosulfonate 1.5%;
chromium lignite 0.5%;
Tabiano clay 9%;
barytes to a density of 1.6 kg/l In the same manner a mud F2 in accordance with the present invention is prepared having the following composition:
Wyoming bentonite 6.4%
iron-sodium lignosulfonate (RD 2000 of the M-I Company) 1.5%;
sodium lignite ("Caustic Lignite" of Baroid) 0.5%;
Tabiano clay 9%;
barytes to a density of 1.6 kg/l.
zirconium citrate 0.81, corresponding to a $Zr^{+4}$ content of 0.09 wt %.

The zirconium citrate is prepared by precipitation with ethanol from an aqueous solution of $ZrOCl_2.8H_2O$ and citric acid in a ½ molar ratio, adjusted to about pH 10 with NaOH. The zirconium complex prepared in this manner has a zirconium content of 11.3 wt % and a carbon content of 19.6 wt %.

In practice the mud F2 differs from the mud F1 in two points:
a) replacement of the iron-chromium lignosulfonate and the chromium lignite with equal quantities of iron-sodium lignosulfonate and sodium lignite;
b) addition of 0.8 wt % of zirconium citrate.

A third mud marked F3 is prepared by adding to the mud F2 a further quantity of zirconium citrate to bring its final content to 1.6%.

The pH of the three compositions is 10±0.3

An aliquot of the muds prepared in this manner is rheologically measured with the Fann 35SA viscometer in R1B1F1 configuration. After taking the rheological measurements at 25° C., the three samples are placed in an oven at a temperature of 180° C. in cells pressurized to 7 kg/cm² and subjected to ageing under dynamic conditions for 16 hours.

After returning to ambient temperature and pressure the rheological parameters are again measured on each sample at 25° C. An additive is effective for high temperature if it enables the mud to maintain, in the absence of phase separation phenomena, the lowest possible yield value without excessive increase in the plastic viscosity. A fluid which after subjection to high temperature has a very low plastic viscosity compared to its yield value is no longer suitable for well drilling.

The results of the rheological measurements on the muds before and after ageing are shown in Table 1, in which the first number refers to the initial mud and the second number to the aged mud. The same table also shows, as do the subsequent tables, the plastic viscosity (PV) and apparent viscosity (AV) in mPas, the yield value (YV) in Pascals and the gel strength (10 sec and 10 min) also in Pascals.

TABLE 1

| MUD | F1 | F2 | F3 |
| --- | --- | --- | --- |
| AV | 51/84 | 34/37 | 31/34 |
| PV | 42/33 | 33/29 | 27/33 |
| YV | 9/51 | 1/8 | 4/1 |
| 10 sec | 2.5/4 | 1.5/1 | 1/1 |
| 10 min | 13/30.5 | 8.5/2 | 6/2 |

A comparison between the rheological parameters of the various muds shows that the zirconium complexes of the present invention are able to fluidity drilling muds containing chromium-free lignites and lignosulfonates even at 180° C., whereas muds of the known art based on chromium lignites and iron-chromium lignosulfonates are much less effective.

EXAMPLE 2

This example demonstrates the possibility of using individual reagents (such as zirconyl chloride and citric acid) diluted in water, as a replacement for the preformed zirconium complex, also demonstrates the effectiveness of the zirconium complex even at a concentration of 0.4% (corresponding to a $Zr^{+4}$ concentration of 0.045 wt %) against the 0.8% of Example 1.

A comparison mud (mud A) is prepared having the following composition:
Wyoming bentonite 6.4%
chromium lignite 0.5%;
iron-chromium lignosulfonate 1.5%;

Tabiano clay 13%;

A further mud (mud B) is prepared having the following composition:

Wyoming bentonite 6.4%
iron-sodium lignosulfonate 1.5%;
sodium lignite 0.5%;
Tabiano clay 13%;
zirconium citrate (prepared as in Example 1) 0.4%

The next mud C has the same composition as mud B, with the difference that instead of containing the preformed zirconium citrate, 10 ml of an aqueous solution containing 4.6 mmoles of citric acid monosodium salt and 2.3 mmoles of $ZrOCl_2.8H_2O$ (molar ratio 2/1) and made basic by adding sodium hydroxide are added to 500 grams of the mud. The $Zr^{+4}$ content of the mud is therefore 0.045, exactly as in the case of mud B.

A further mud (mud D) is prepared as described for mud C, the only difference being a 4/1 molar ratio of the citric acid monosodium salt to the $ZrOCl_2.8H_2O$ present in the aqueous solution added to the mud. 500 grams of mud D therefore contain 2.3 mmoles of $Zr^{+4}$ and 9.2 mmoles of citric acid.

After taking the rheological measurements at 25° C., the four samples are placed in an oven at a temperature of 180° C. in cells pressurized to 7 kg/cm² and subjected to ageing under dynamic conditions for 16 hours.

After returning to ambient temperature and pressure the rheological parameters are again measured on each sample at 25° C. Table 2 shows the rheological parameters of the muds before and after ageing.

TABLE 2

| MUD | A | B | C | D |
|---|---|---|---|---|
| AV | 51/65 | 23/21 | 26/29 | 25/41 |
| PV | 42/32 | 22/16 | 24/20 | 24/22 |
| YV | 9/33 | 1/5 | 2/9 | 1/19 |
| 10 sec | 2/30 | 1/1.5 | 1/6 | 1/24 |
| 10 min | 9/46 | 2.5/10 | 1.5/32 | 1.5/38 |

EXAMPLE 3

This example demonstrates the effectiveness of the zirconium complex even at 0.2% and the fact that there is virtually no difference between adding the preformed complex or its reagents dissolved in water to the mud.

A mud (mud R) is prepared having the following composition:

Wyoming bentonite 6.4%
iron-sodium lignosulfonate 1.5%;
sodium lignite 0.5%;
Tabiano clay 13%;
zirconium citrate (prepared as in Example 1) 0.2%, corresponding to a $Zr^{+4}$ content of The next mud S has the same composition as mud R, but with the difference that instead of containing the preformed zirconium citrate, 10 ml of an aqueous solution containing 2.3 mmoles of citric acid and 1.2 mmoles of $ZrOCl_2.8H_2O$ (molar ratio 2/1) and made basic by adding sodium hydroxide are added to 500 grams of the mud.

A further mud (mud T) is prepared as described for mud S, the only difference being a 4/1 molar ratio of the citric acid to the $ZrOCl_2.8H_2O$ present in the aqueous solution added to the mud. The base mud is then diluted with a quantity of water equal to that added to the additived mud.

After taking the rheological measurements at 25° C. on an aliquot of the muds, the three samples are placed in an oven at a temperature of 180° C. in cells pressurized to 7 kg/cm² and subjected to ageing under dynamic conditions for 16 hours.

After returning to ambient temperature and pressure the rheological parameters are again measured on each sample at 25° C. (Table 3).

TABLE 3

| MUD | R | S | T |
|---|---|---|---|
| AV | 26/40 | 24/53 | 25/56 |
| PV | 24/24 | 20/32 | 24/22 |
| YV | 2/16 | 4/21 | 1/34 |
| 10 sec | 1/17 | 1/28 | 0.5/34 |
| 10 min | 2/35 | 2/34 | 1.5/39 |

EXAMPLES 4–6

The appropriate quantities of $ZrOCl_2.8H_2O$ and various organic acids of general formula (I) are brought into solution, which is then adjusted to pH 10–12.

The solutions obtained are added to 500 g of base mud adjusted to pH 10.

The base mud has the following composition:
Wyoming bentonite 6.4%
iron-sodium lignosulfonate 1.5%;
sodium lignite 0.5%;
Tabiano clay 9%;

The base muds (to which a water volume equal to the additives solution volume is added) and the muds with additives are subjected to rheological measurement immediately on-preparation and after ageing for 12 hours at 120° C.

EXAMPLE 4

2.3 mmoles of $ZrOCl_2.8H_2O$ ($Zr^{+4}$ content=0.045 wt %) and citric acid monosodium salt are added to the base mud, the molar citric acid/$ZrOCl_2.8H_2O$ ratio being 2 in test 4A and 6 in test 4B. The rheological properties are shown in Table 4.

TABLE 4

| MUD | Base | 4A | 4B |
|---|---|---|---|
| AV | 30/45 | 25/33 | 25/28 |
| PV | 15/30 | 22/28 | 22/22 |
| YV | 15/15 | 3/5 | 3/6 |
| 10 sec | 1.5/9 | 1.5/2.5 | 1.5/2 |
| 10 min | 4.5/28 | 2.5/7.5 | 3/5 |

EXAMPLE 5

2.3 mmoles of $ZrOCl_2.8H_2O$ and glycolic acid are added to the base mud, the molar glycolic acid/$ZrOCl_2.8H_2O$ ratio being 2 in test 5A and 6 in test 5B. The rheological properties are shown in Table 5.

TABLE 5

| MUD | Base | 5A | 5B |
|---|---|---|---|
| AV | 30/45 | 29/43 | 27/43 |
| PV | 15/30 | 24/28 | 23/32 |
| YV | 15/15 | 5/15 | 4/11 |
| 10 sec | 1.5/9 | 1.5/10 | 1.5/5 |
| 10 min | 4.5/28 | 9/29 | 4/17 |

From the data of Table 5 it can be seen that the performance of muds with additives improves as the glycolic acid excess increases.

EXAMPLE 6

2.3 mmoles of $ZrOCl_2.8H_2O$ and tartaric acid are added to the base mud, the molar tartaric acid/-

ZrOCl$_2$.8H$_2$O ratio being 2 in test 6A and 6 in test 6B. The rheological properties are shown in Table 6.

TABLE 6

| MUD | Base | 6A | 6B |
|---|---|---|---|
| AV | 30/45 | 26/29 | 28/20 |
| PV | 15/30 | 24/24 | 26/22 |
| YV | 15/15 | 2/5 | 2/8 |
| 10 sec | 1.5/9 | 1/2.5 | 1.5/2.5 |
| 10 min | 4.5/28 | 2.5/8 | 2.5/10 |

EXAMPLE 7

Using the method of Examples 4–6, a base mud is prepared together with further muds obtained from the base mud by adding Zr$^{+4}$ (always in the form of ZrOCl$_2$) and acids of general formula (I).

The base mud has the following composition:
Wyoming bentonite 6.4%
iron-sodium lignosulfonate 1.5%;
sodium lignite 0.5%;
Tabiano clay 9%.

Mud 7A was prepared by adding to 500 grams of the base mud 2.3 mmoles Zr$^{+4}$ (equivalent in zirconium content to the preceding formulations with 0.4% of zirconium citrate) and 41.4 mmoles of lactic acid (molar Zr$^{+4}$/lactic acid ratio equal to 1/18) dissolved in 10 ml of water.

Mud 7B was prepared as 7A, but with glycolic acid instead of lactic acid (molar Zr$^{+4}$/glycolic acid ratio equal to 1/18).

Mud 7C is a comparison mud containing chromium, of the following composition:
Wyoming bentonite 6.4%
iron-chromium lignosulfonate 1.5%;
chromium lignite 0.5%;
Tabiano clay 9%.

The muds prepared in this manner are aged for 16 hours at 180° C., Table 7 shows the rheological properties of these muds before and after thermal treatment.

TABLE 7

| MUD | Base | 7A | 7B | 7C |
|---|---|---|---|---|
| AV | 18/n.d. | 18/48 | 21/37 | 24/38 |
| PV | 16/n.d. | 14/22 | 20/24 | 22/22 |
| YV | 2/n.d. | 4/26 | 1/13 | 2/16 |
| 10 sec | 1/n.d. | 1/22 | 1/7 | 1/9 |
| 10 min | 2/n.d. | 2.5/52 | 2/50 | 2.5/39 | n.d. indicates that the rheological properties cannot be determined.

Table 7 shows that under these extreme conditions a traditional mud without chromium and zirconium complexes does not function at all. The rheological behaviour of mud 7B is comparable with that of the chrome-containing mud 7C, but has the considerable advantage of being totally free from chromium.

EXAMPLE 8

A base mud is prepared having the following composition:
Wyoming bentonite 6.4%
iron-sodium lignosulfonate 1.5%;
sodium lignite 0.5%;
Tabiano clay 13%.

45 ml of an aqueous solution containing 4.8 mmoles of ZrOCl$_2$.8H$_2$O and 9.6 mmoles of citric acid is added to 500 grams of the base mud to obtain mud 8A (Zr$^{+4}$ content 0.09%, corresponding to 0.8% of zirconium citrate).

A further mud 8B is prepared from the base mud by adding 45 ml of an aqueous solution containing 9.6 mmoles of ZrOCl$_2$.8H$_2$O and 19.2 mmoles of citric acid to 500 grams of the base mud, to obtain a mud with a Zr$^{+4}$ content corresponding to 1.6% of zirconium citrate.

For comparison, a mud is prepared containing:
Wyoming bentonite 6.4%
iron-chromium lignosulfonate 1.5%;
chromium lignite 0.5%;
Tabiano clay 13%.

The mud prepared in this manner is then diluted with 45 ml of water, to obtain a mud 8C of composition comparable with 8A and 8B.

The muds prepared in this manner were aged for 16 hours at 200° C. Table 8 shows the rheological properties of the original muds and the aged muds.

TABLE 8

| MUD | 8A | 8B | 8C |
|---|---|---|---|
| AV | 16/36 | 15/26 | 26/57 |
| PV | 15/30 | 14/19 | 21/49 |
| YV | 1/6 | 1/7 | 5/8 |
| 10 sec | 1/6.5 | 1.5/3 | 1.5/11 |
| 10 min | 1.5/23.5 | 2.5/6 | 3/28.5 |

The data of Table 8 show that formulations comprising zirconium are more effective than formulations comprising chromium. It can also be seen that greater quantities of the complex formed in situ improve the already good rheological performance.

EXAMPLE 9

A lime-containing base mud is prepared having the following composition:
Wyoming bentonite 6.4%
iron-sodium lignosulfonate 1.5%;
sodium lignite 0.5%;
Tabiano clay 9%.
slaked lime 0.5%.

Further muds are then made up with added zirconium citrate prepared as in Example 1, namely mud 9A with 0.4% of zirconium citrate (corresponding to a Zr$^{+4}$ content of 0.045%), mud 9B with 0.81 of zirconium citrate and mud 9C with 1.6% of zirconium citrate. The muds are aged for 16 hours at 180° C. The results are given in Table 9

TABLE 9

| MUD | Base | 9A | 9B | 9C |
|---|---|---|---|---|
| AV | 36.5/70 | 20.5/53.5 | 19/25 | 22/24 |
| PV | 29/24 | 20/35 | 18/18 | 19/20 |
| YV | 7.5/46 | 0.5/18.5 | 1/7 | 3/4 |
| 10 sec | 2/25 | 2.5/18 | 2/3 | 2.5/2 |
| 10 min | 26/26 | 4/21 | 3/11 | 3/3 |

A comparison of the rheological parameters before and after ageing confirms the capacity of the formulation of the present invention to oppose worsening of the rheological properties of a mud subjected to ageing, including a lime-containing mud formulation.

EXAMPLE 10

This example demonstrates the effectiveness of the complex isolated in acid form (as described in Russian Journal of Inorganic Chemistry vol. 12 (10), 1967, page 1437), starting from ZrOCl$_2$.8H$_2$O and citric acid. The complex obtained has a zirconium content of 28.8 wt % and a carbon content of 19.7 wt %.

The possibility of using the complex in acid form as additive for the mud is also demonstrated.

A base mud is prepared having the following composition:
Wyoming bentonite 6.4%
iron-sodium lignosulfonate 1.5%;
sodium lignite 0.5%;
Tabiano clay 13%.

Further muds are then prepared comprising different quantities of the zirconium citrate complex.

Mud 10A consists of the base mud with 0.2% of added zirconium citrate, mud 10B with 0.4% of zirconium citrate and mud 10C with 0.8% of zirconium citrate.

The muds prepared in this manner are aged for 16 hours at 180° C. Table 10 shows the rheological properties of the described muds.

TABLE 10

| MUD | Base | 10A | 10B | 10C |
|---|---|---|---|---|
| AV | 32/n.d. | 25/34 | 25/30 | 25/29 |
| PV | 25/n.d. | 21/29 | 21/24 | 21/24 |
| YV | 7/n.d. | 4/5 | 4/6 | 4/5 |
| 10 sec | 2/n.d. | 2.5/2.5 | 1.5/2 | 1.5/2.3 |
| 10 min | 16.5/n.d. | 3/5 | 2.5/3 | 2.5/3 |

EXAMPLE 11

This example demonstrates the effectiveness of muds based on sodium lignite and sodium lignosulfonates in the presence of the complex isolated in acid form (as described in Russian Journal of Inorganic Chemistry vol. 12 (10), 1967, page 1437), starting from $ZrOCl_2 \cdot 8H_2O$ and citric acid.

A mud 11A is prepared having the following composition:
Wyoming bentonite 6.4%
sodium lignosulfonate (type "Serla Solvyn" of the Metsa Serla Company) 1.5%;
sodium lignite 0.5%;
Tabiano clay 9%.
zirconium citrate 0.4%.

A mud 11B is prepared consisting of the mud 11A plus a further 0.4% of zirconium citrate.

A third comparison mud 11C is also prepared consisting of:
Wyoming bentonite 6.4%
iron-chromium lignosulfonate 1.5%;
chromium lignite 0.5%;
Tabiano clay 9%.

The muds prepared in this manner are aged for 16 hours at 180° C.

Table 11 shows the rheological properties of the described muds.

TABLE 11

| MUD | 11A | 11B | 11C |
|---|---|---|---|
| AV | 31/47 | 25/41 | 44/60 |
| PV | 27/38 | 23/38 | 40/37 |
| YV | 4/9 | 2/3 | 4/23 |
| 10 sec | 0.5/1 | 0.5/0.5 | 0.5/20 |
| 10 min | 1.5/8 | 1/0.5 | 3/39 |

EXAMPLE 12

This example demonstrates how the complexes of the present invention are effective in fluidifying chromium-free mud formulations based on iron-sodium lignosulfonates+sodium lignites, or based on modified tannin+sodium lignites, even at high temperature.

For this purpose the following are prepared:
1) a mud 12A having the following composition:
Wyoming bentonite 6.4%
sodium lignite 0.54%;
iron-sodium lignosulfonate 1.5%;
Tabiano clay 13%.
2) a mud 12B corresponding to the mud 12A but with the addition of 0.2% of the zirconium citrate of Example 1.
3) a mud 12C having the following composition:
Wyoming bentonite 6.4%
modified tannin 1.5%;
sodium lignite 0.5%;
Tabiano clay 13%.
4) a mud 12D corresponding to the mud 12C but with the addition of 0.2% of zirconium citrate.

Table 12 shows the rheological measurements effected on said muds at ambient temperature. The first figure corresponds to the mud as such, the second to the mud aged for 12 hours at 180° C., the third to the mud aged for 48 hours at 180° C.

TABLE 12

| MUD | 12A | 12B | 12C | 12D |
|---|---|---|---|---|
| AV | 41/nd/nd | 23/50/56 | 54/75/nd | 45/50/56 |
| PV | 34/nd/nd | 28/40/40 | 42/58/nd | 36/40/46 |
| YV | 7/nd/nd | 4/10/16 | 12/17/nd | 9/10/10 |
| 10 sec | 2/nd/nd | 1.5/3/5 | 2.5/4/nd | 2.5/2.5/3 |
| 10 min | 7/nd/nd | 2/23/43 | 3/26/nd | 3/10/17 |

The results of Table 12 indicate that muds not containing zirconium citrate have poor rheological characteristics after ageing.

In contrast, muds with added complexes of the present invention have excellent properties even after ageing.

EXAMPLE 13

The characteristics of the muds of Examples 13 and 14 were measured with a VOR Bohlin viscometer using a program of increasing shearing force within a range of $1 \text{ sec}^{-1}$ to $1000 \text{ sec}^{-1}$ and measuring the corresponding stress. The plastic viscosity (PV) is obtained by linearly interpolating the points between $500 \text{ sec}^{-1}$ and $1000 \text{ sec}^{-1}$.

The yield value (YV) is obtained by extrapolating to $0 \text{ sec}^{-1}$ the shearing force within a range of points between $1 \text{ sec}^{-1}$ and $10 \text{ sec}^{-1}$.

G' (elastic modulus) is a measurement of the degree of gelling and is obtained by making an oscillation measurement with the VOR Bohlin within the fluid viscoelastic region at an oscillation frequency of 1 Hz, after leaving the sample standing for 15 minutes.

After effecting the rheological measurements at 25° C., the samples are placed in an oven at a temperature of between 150° and 180° C. in cells pressurized to 7 kg/cm² and subjected to ageing under dynamic conditions for 16 hours.

Having returned to ambient temperature and pressure the rheological parameters are again measured on each sample at 25° C. The zirconyl glycolate is prepared by adding Elycolic acid to a 2% $ZrOCl_2 \cdot 8H_2O$ solution in water while stirring, the overall $ZrO^{++}$/acid molar ratio being ½. The immediate formation of the white complex is observed and the final pH is 1.5. The precipitate is separated by centrifuging and washed with a pH 2 glycolic acid solution, until the chloride ions disappear. The acid precipitate is redissolved by making basic with NaOH to pH 8. The aqueous solution is concentrated under hot conditions in a rotary evaporator and dried in a vacuum oven at 40° C. to obtain the dry complex in salified form, for use in fluidifying drilling mud. Zirconyl oxalate is prepared by the same method.

The following fluids are prepared:
- a base fluid (13R) containing 6.4% of Magcogel bentonite, 7.4% of Tabiano clay, 0.5% of iron-chromium lignosulfonate ("Q-Broxin" of Baroid) and barytes in a quantity such to achieve a density of 1200 kg/m$^3$;
- a fluid (13S) consisting of the fluid (13R) plus 1.0% of sodium lignite ("CC16" of Baroid);
- a fluid (13U) consisting of the fluid (13S) plus 0.2% of zirconium glycolate;
- a fluid (13V) consisting of the fluid (13S) plus 0.2% of zirconium oxalate;
- a fluid (13H) consisting of the fluid (13R) plus 1.0% of chromium lignite.

The fluids (13R), (13S) and (13H) are used for comparative purposes.

The results of the rheological measurements are shown in Table 13, in which PV is expressed in mPas, and YV and G' in Pascals (Pa). The data show that a 0.1–0.2% concentration of the complexes of the present invention is able to fluidify mud containing 1% of sodium lignites even at 180° C. In addition, the muds with added complexes of the present invention have better rheological characteristics than the muds with added chromium lignite.

TABLE 13

| MUD | 13R | 13S | 13U | 13V | 13H |
|---|---|---|---|---|---|
| PV | 34/59 | 38/88 | 37/57 | 37/70 | 35/84 |
| YV | 0.3/9.3 | 0.1/1 | 0/0.5 | 0.1/1.8 | 0/2.4 |
| G' | 1/72 | 0.9/56 | 1.1/11 | 0.9/21 | 1.2/25 |

EXAMPLE 14

The following fluids are prepared in the manner described in Example 13:
- a base fluid (14A) containing 4.2% of Magcogel bentonite, 21% of Tabiano clay, 0.5% of iron-chromium lignosulfonate and NaOH in a quantity such as to achieve a pH of 10.2–10.5;
- a fluid (14B) consisting of the fluid (14A) plus 1.0% of sodium lignite;
- a fluid (14C) consisting of the fluid (14B) plus 0.25% of zirconium glycolate;
- a fluid (14D) consisting of the fluid (14B) plus 0.25% of zirconium oxalate;

The results of the rheological measurements before and after ageing are shown in Table 14.

TABLE 14

| MUD | 14A | 14B | 14C | 14D |
|---|---|---|---|---|
| PV | 34/112 | 26/107 | 26/65 | 26/64 |
| YV | 4.1/104 | 5/20 | 4.5/11 | 7/13 |
| G' | 86/283 | 58/205 | 90/173 | 88/299 |

EXAMPLE 15

A base mud (15A) identical to (14A) and a base mud (15B) identical to (14B) are used.

A mud (15C) is prepared consisting of the mud (15B) plus 0.25 wt % of zirconyl chloride and sodium titrate (molar ratio ½) in a 15 wt % aqueous solution.

A final mud (15D) is prepared consisting of the mud (15B) plus 0.25% of zirconyl acetate.

The formulations (15A), (15B) and (15D) are for comparison purposes. The results of the rheological measurements are given 15 in Table 15.

TABLE 15

| MUD | 15A | 15B | 15C | 15D |
|---|---|---|---|---|
| PV | 34/112 | 26/107 | 21/72 | 50/90 |
| YV | 4.1/104 | 5/20 | 0.2/0.8 | 20/26 |
| G' | 86/283 | 58/205 | 12/8 | 380/439 |

Table 15 clearly shows that complexes of zirconium with acids not of general formula (I) are ineffective.

We claim:

1. A drilling mud composition based on water and clays which is stable to about 200° C. comprising:
   a) a dispersant selected from the group consisting of lignosulfonates, lignites and modified tannins; and
   b) a complex of tetravalent zirconium and one or more organic acids or salts thereof, wherein the organic acid has formula (I)

wherein R$_1$ and R$_2$, which can be the same or different, represent —H, —COOH, —CH$_3$, —CH$_2$COOH or —CH(OH)COOH, or R$_1$ and R$_2$ jointly represent an oxo group (=O).

2. The drilling mud composition of claim 1, wherein the dispersants are selected from the group consisting of sodium, iron-chromium, iron and tin lignosulfonates; alkali metal, chromium or ammonium lignites; and tannin sulfoalkylates, the counter-ion of which is selected from the group consisting of chromium, heavy metal ions, alkali metals and ammonium ion.

3. The drilling mud composition as claimed in claim 2, wherein the dispersants are selected from the group consisting of sodium, tin and iron lignosulfonates; sodium and potassium lignites and tannin sulfoalkylates of alkali metals or ammonium ion.

4. The drilling mud composition of claim 1, wherein the composition contains a dispersant in a quantity of between 0.1 and 5 wt.% and Zr$^{+4}$ complexes in a quantity, expressed in grams of Zr$^{+4}$, of between 0.01% and 0.4%.

5. The drilling mud of claim 4, wherein said dispersant is present in a quantity of between 0.3 and 3 wt.%, and said Zr$^4$ complexes are present in a quantity, expressed as grams of Zr$^4$, of between 0.02 wt.% and 0.2 wt.%.

6. The drilling mud of claim 1, which further comprises an excess, of up to 25/1 molar based on the tetravalent zirconium complex, of the acid of formula (I).

7. A process for preparing an aqueous mud stable to about 200°, consisting of:
   adding to a base mud of water and clays,
   (a) a dispersant selected from the group consisting of lignosulfonates, lignites and modified tannins; and (b) a complex of tetravalent zirconium and one or more organic acids or salts thereof, wherein the organic acid has formula (I)

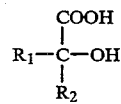

wherein $R_1$ and $R_2$, which can be the same or different, each represent —H, —COOH, —CH$_3$, —CH$_2$COOH or —CH(OH)COOH, or $R_1$ and $R_2$ jointly represent an oxo group (=O).

8. The process of claim 7, wherein the substances added to said base mud of water and clays further comprise viscosity modifying agents and filtrate reducers.

9. A process for preparing aqueous mud stable to about 200° C., consisting of:
adding to a base mud of water and clays,
(a) a dispersant selected from the group consisting of lignosulfonates, lignites and modified tannin; and
(b) a tetravalent zirconium salt and one or more organic acids or salts thereof of formula (I), as set forth in claim 1, in a molar ratio of acid of formula (I) to zirconium salt of about 40/1.

10. The process of claim 9, wherein the substances added to said base mud of water and clays further comprise viscosity modifying agents and filtrate reducers.

11. A method of drilling oil wells, comprising: drilling said oil well while adding the drilling mud composition of claim 1 to the oil well.

12. The method of claim 11, wherein temperatures of about 200° C. are encountered at depth in the drilling of the oil well.

* * * * *